May 23, 1944. H. A. EVANS 2,349,256
MACHINE FOR CONTINUOUSLY COATING AND/OR PERMEATING SHEETS
Filed Aug. 14, 1941 13 Sheets-Sheet 2

Inventor
Harold A. Evans
By Thomas A. Jenckes
Attorney

Inventor
Harold A. Evans
By Thomas A. Jenkes
Attorney

May 23, 1944.　　　H. A. EVANS　　　2,349,256
MACHINE FOR CONTINUOUSLY COATING AND/OR PERMEATING SHEETS
Filed Aug. 14, 1941　　　13 Sheets-Sheet 6

Inventor
Harold A. Evans
By Thomas A. Jenks
Attorney

Inventor
Harold A. Evans
By Thomas A. Jenckes
Attorney

Inventor
Harold A. Evans
By Thomas A. Jenkes
Attorney

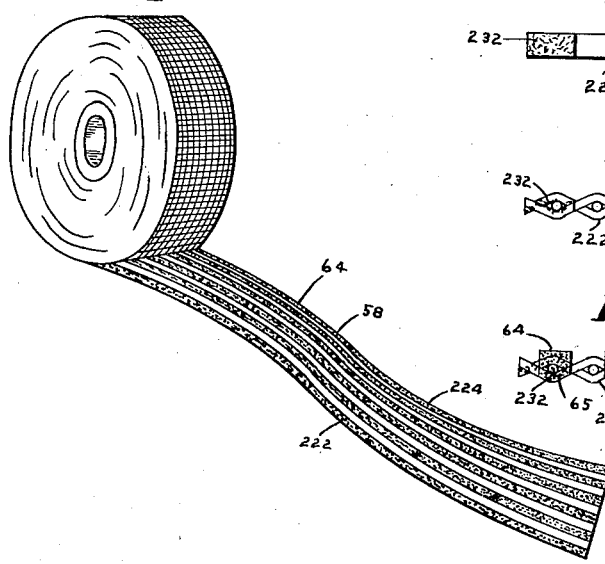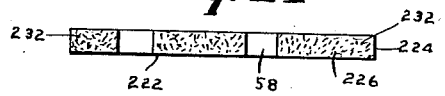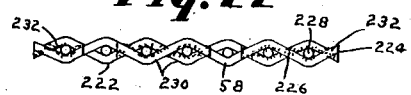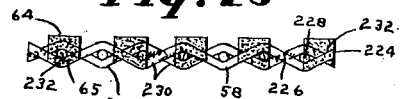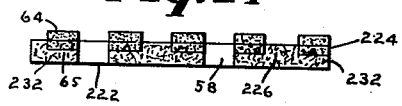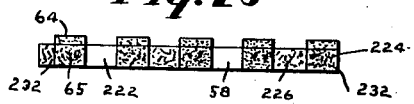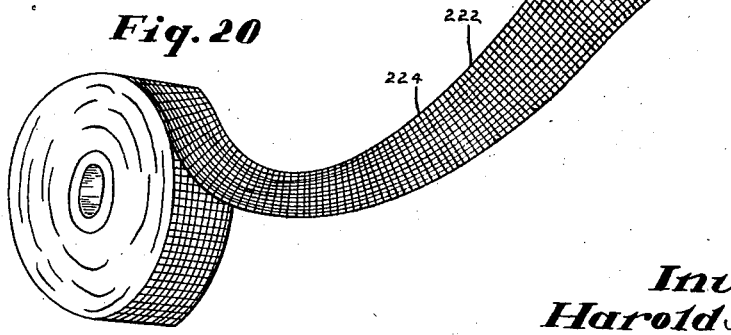

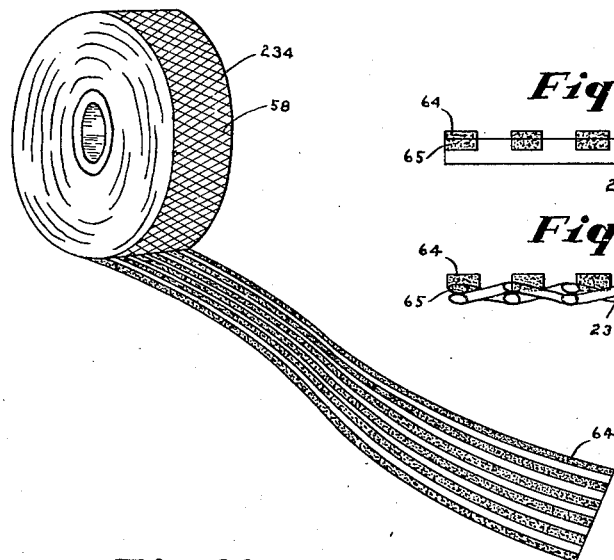
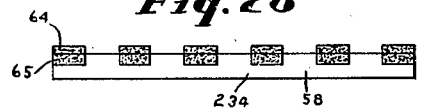
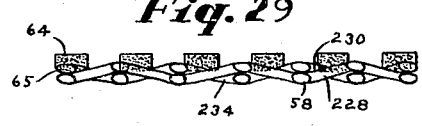
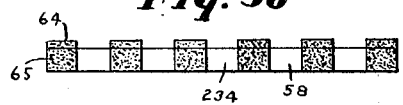
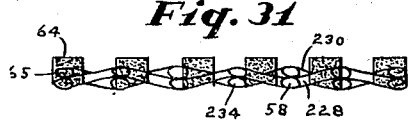
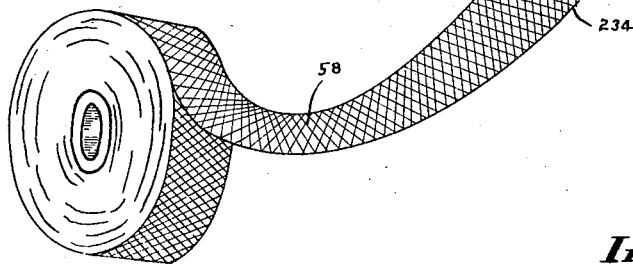

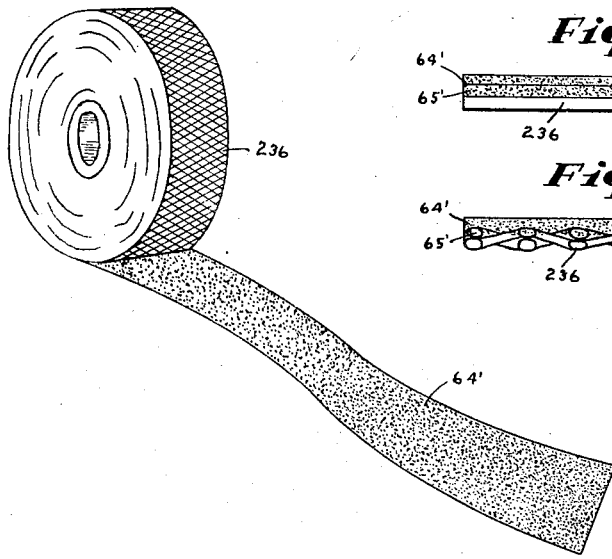
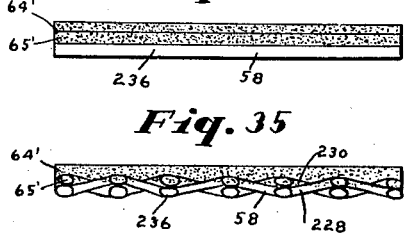
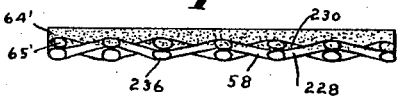
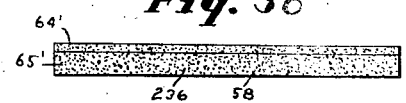
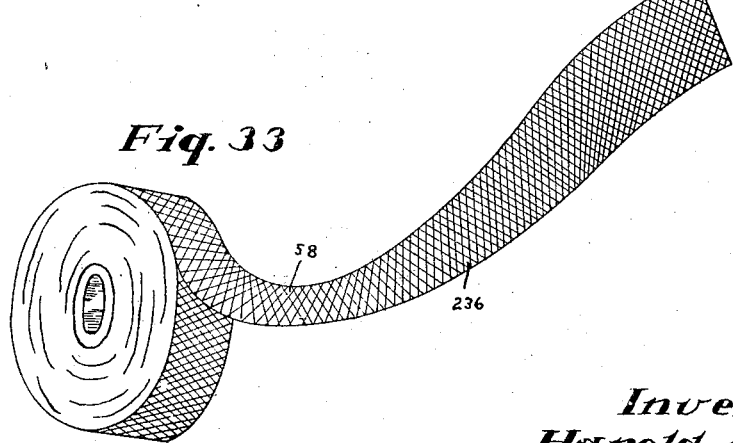

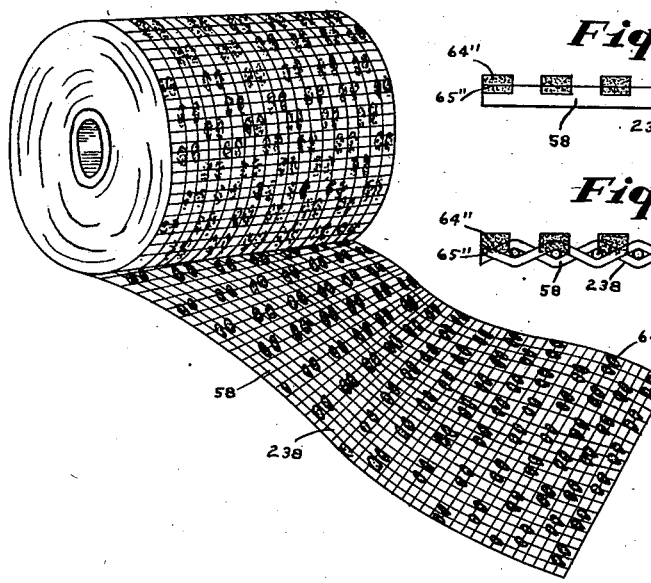
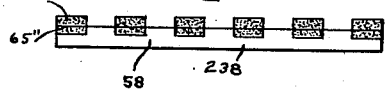
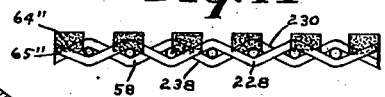
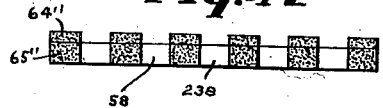
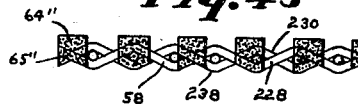
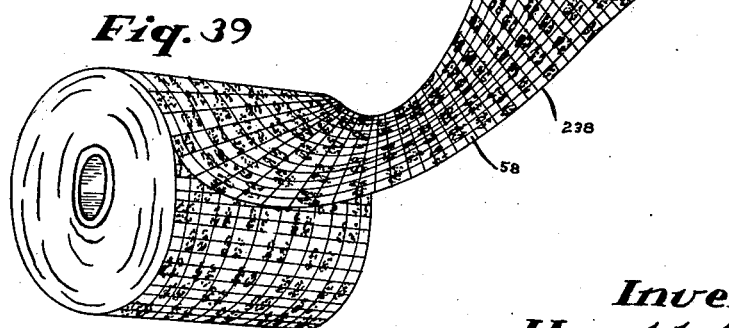

May 23, 1944.  H. A. EVANS  2,349,256
MACHINE FOR CONTINUOUSLY COATING AND/OR PERMEATING SHEETS
Filed Aug. 14, 1941   13 Sheets-Sheet 13
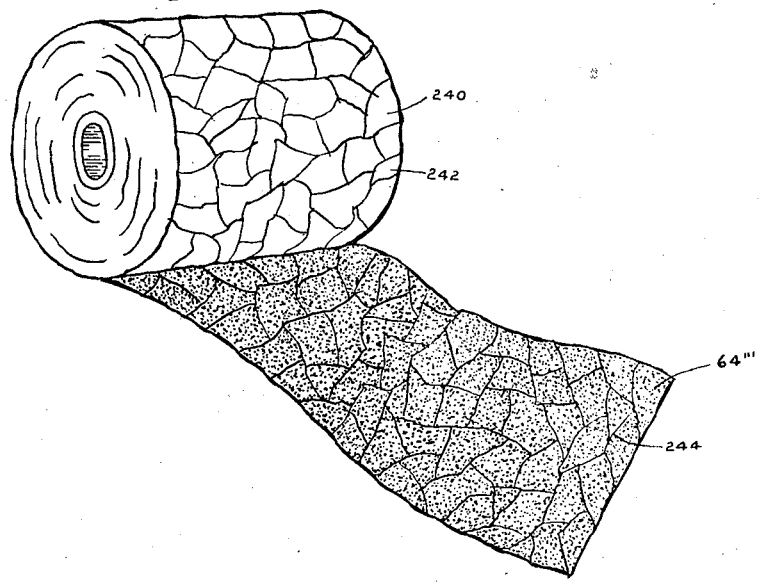
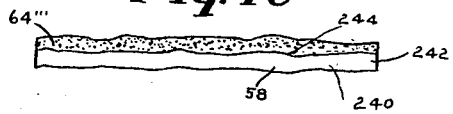
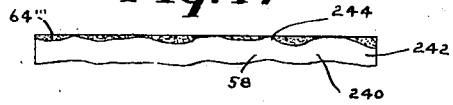
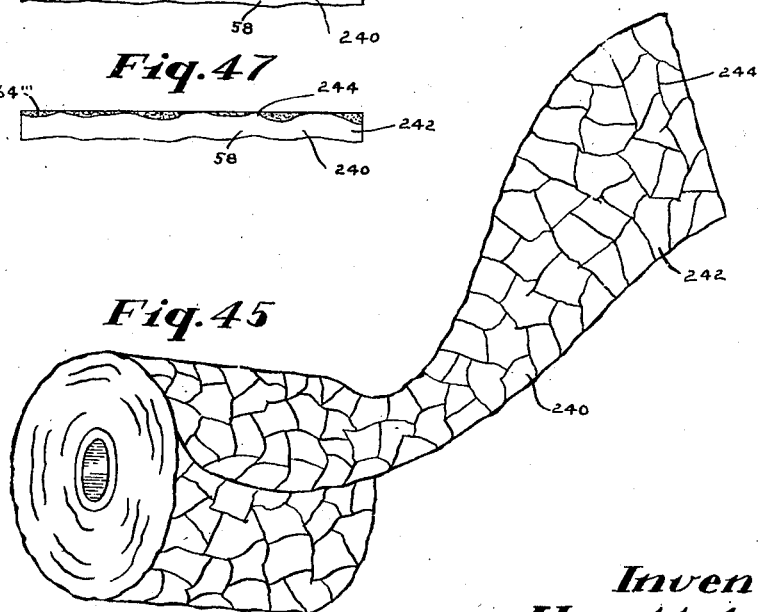
Inventor
Harold A. Evans
By Thomas A. Jenckes
Attorney Patented May 23, 1944

2,349,256

UNITED STATES PATENT OFFICE 2,349,256

MACHINE FOR CONTINUOUSLY COATING AND/OR PERMEATING SHEETS

Harold A. Evans, Fairhaven, Mass., assignor to Coreve Corporation, Fairhaven, Mass., a corporation of Massachusetts Application August 14, 1941, Serial No. 406,889

21 Claims. (Cl. 91—12)

My invention relates to improvements in machines for continuously coating and/or permeating sheets.

In the prior art where it has been desired to coat fabrics, or other materials in sheet form, calendering machines or spreading machines have been hithereto employed which merely literally coated said sheet or applied a layer of material thereto without said layer permeating the sheet to any appreciable extent. When it has been desired to thoroughly permeate a fabric sheet with a liquid material, so called impregnating machines have been employed in which the fabrics have been soaked in the material and the excess removed therefrom.

An object of my invention is to provide a machine which may be selectively employed to either entirely impregnate a fabric sheet with a liquid or alternatively to apply a surface covering thereto.

A main object of my invention, however, is to provide a novel type of machine which will both coat the fabric with a surface layer and at the same time permeate it with a portion of said same layer so that said thus coated and permeated layer will be positively locked into the sheet to be covered and therefore be not readily removable therefrom as the surface coatings of the prior art have been.

A further object of my invention is to provide a machine which will either coat and/or permeate the fabric with a continuous sheet of material, with spaced aligned stripes of material or with intermittent areas of material.

A further object of my invention is to provide a machine capable of providing such a coated permeated sheet which will project at an even height throughout the surface of said sheet and in which said applied material will project above the surface in compact formation.

While my invention may be employed to coat or permeate any type of a continuous sheet with suitable material, it is particularly adapted for use in coating and/or permeating such a sheet with adhesive material. While any type of adhesive material may be employed which will set to its desired permanent position, such as a thermo-plastic which changes from liquid to semi-solid or solid form, my invention is particularly adapted for use in applying a soluble adhesive dissolved in a suitable solvent, which solvent may be later removed to provide a purely pressure sensitive adhesive on the sheet.

I am aware that in the prior art attempts have been made to coat and/or permeate a continuous sheet by passing it between two stationary parts. I have found that if the edges of such a sheet have any tendency to curl and turn over that it is impossible to prevent such curling or turning over on passage of such a sheet between two stationary parts. An object of my invention, therefore, is to provide a novel type of machine having a continuously rotatable cylindrical surface and a pivotally mounted stationary part bearing against said surface, and I have discovered that with such a machine, this tendency of the edges of such a treated sheet to curl and turn over is overcome, to continuously provide a suitably coated and/or permeated flat sheet.

My improved machine is particularly designed for treating bias-cut fabrics. Attempts have been made to coat and/or permeate bias-cut fabrics between two rollers or two other movable parts. Such attempts have not proved practical as the nip between the rolls will tend to bite the filling of the fabric and cause it to move diagonally along the lines of warp threads and hence sway laterally between the rolls, either running off of the machine or providing an impractical finished sheet. Employing my machine with a continuously rotating cylinder and a stationary fountain pivotally held against it, I am able to provide a machine in which the fountain itself will positively function as an ironer to positively hold the fabric against any lateral sway for bias or non-bias fabrics.

I preferably so construct the lower ironing surface of my improved fountain that a coating passageway or slot for forming a coating in sheet or strip formation between the lower end of the fountain and the rotating cylinder may be provided. I have also discovered that if the rotating cylindrical member be provided with a resilient surface that it may function as a pad against which the pivoted stamp provided by the pivoted fountain may function to positively prevent any bleeding or leakage of material between the feeding lower end of the fountain and the cylindrical stamp or pad, particularly if it be desired to feed the coated or permeated material through the fountain under fluid, preferably gaseous pressure, the pivotable weight of the fountain pivoting against the pad positively providing a seal around the edges thereof to prevent any bleeding of the liquid material applied through the fountain, and in order to positively insure that there will be no bleeding, I preferably provide an adjustable weight to be added to the fountain to increase the gravity pressure against the pad, thereby providing a sealing means greater than any amount of fluid pressure which may be applied to coat and/or permeate the continuous treated sheet, causing said fountain to positively function at all times as a damming means. I have discovered that with this construction and a distinct amount of fluid pressure, that plastic material may not only be applied to the sheet as a covering, but that it also may at least partially permeate the sheet.

I have discovered, however, that the tendency of the machine to permeate the material within the sheet may be increased by providing a slot between the cylinder pad and fountain of progressively decreasing height so as to compact the applied layer and force it inwardly of the treated sheet, causing it to at least partially permeate said sheet to positively interlock under the threads of the fibers thereof to apply a coated layer to said fabric substantially impossible to remove, and also provide a permeated layer in sheet or strip formation, which composite layer may be provided in a single run through my improved machine. I am thus able to provide a machine which will provide a desirable coated and/or permeated layer with a single run of the sheet to be treated through the machine applying a single layer thereto, as against successive coats formerly necessary to produce the same results on successive passages of the treated sheet through any standard type of spreading machine.

A further object of my ivention is to provide a machine which will alternatively provide a layer in sheet or stripe formation, and which may be so modified as to produce intermittent areas of material on the treated sheet, whether intermittent strips, sheets, dots, or otherwise.

Further features of my invention relate to improvements in the particular structure of the fountain and feed shoe I preferably employ, as well as the other novel structural features of the machine.

These and such other objects of my invention as may hereinafter appear will be best understood from a description of the accompanying drawings which illustrate various embodiments of my invention modified to produce commercial or surgical tape, and illustrate various types of articles which may be readily produced by my invention.

In the drawings, Fig. 1 is a diagrammatic side elevation of an embodiment of my invention particularly adapted to produce surgical tape having spaced stripes of adhesive on the surface thereof in use, with portions of said spaced stripes of adhesive at least partially permeating said tape fabric if desired.

Figs. 19-47 illustrate various types of continuous sheets which may be coated or permeated by my improved machine.

Figure 1:
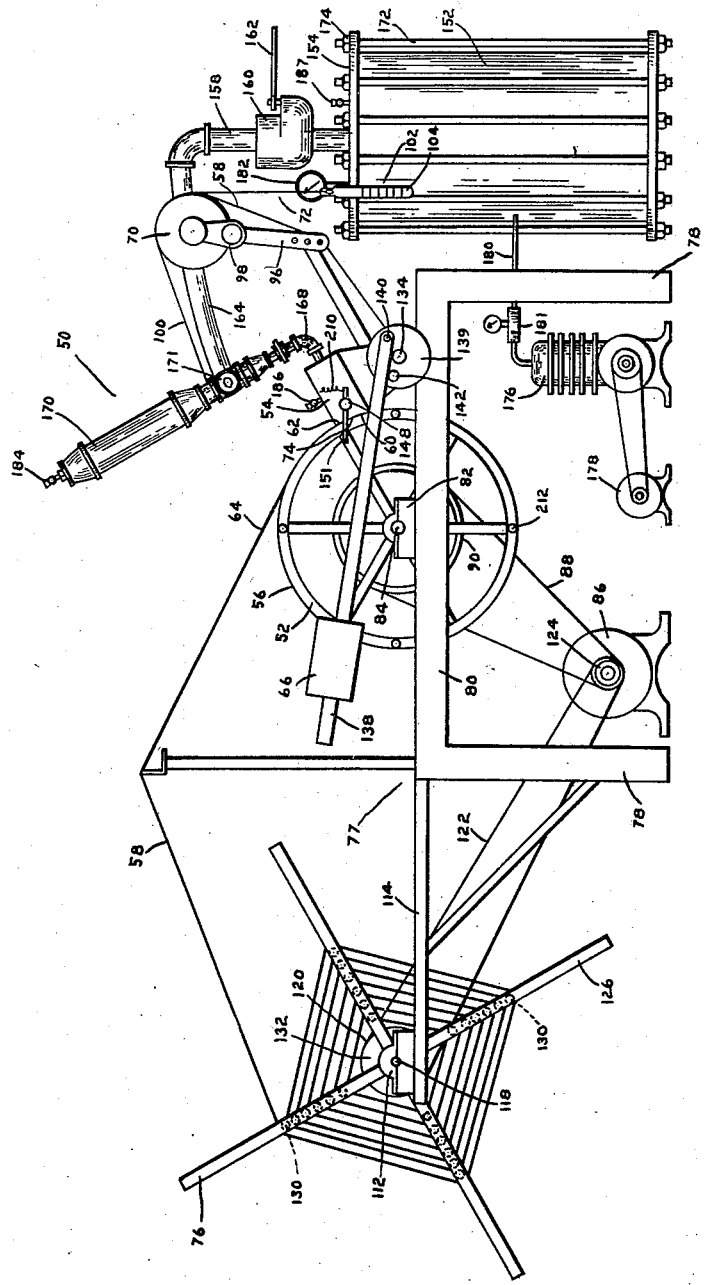
Figure 2:
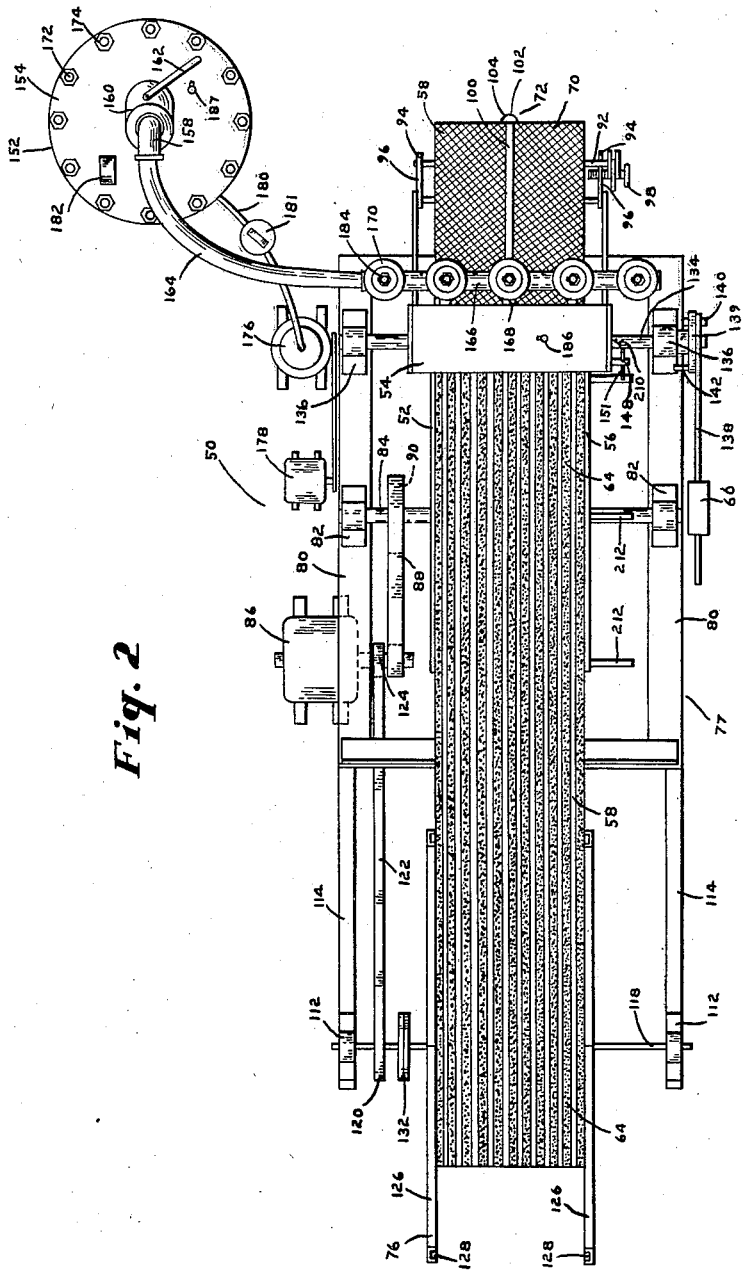
Fig. 2 is a diagrammatic plan view of the embodiment of my invention shown in Fig. 1 in use.
Figure 3:
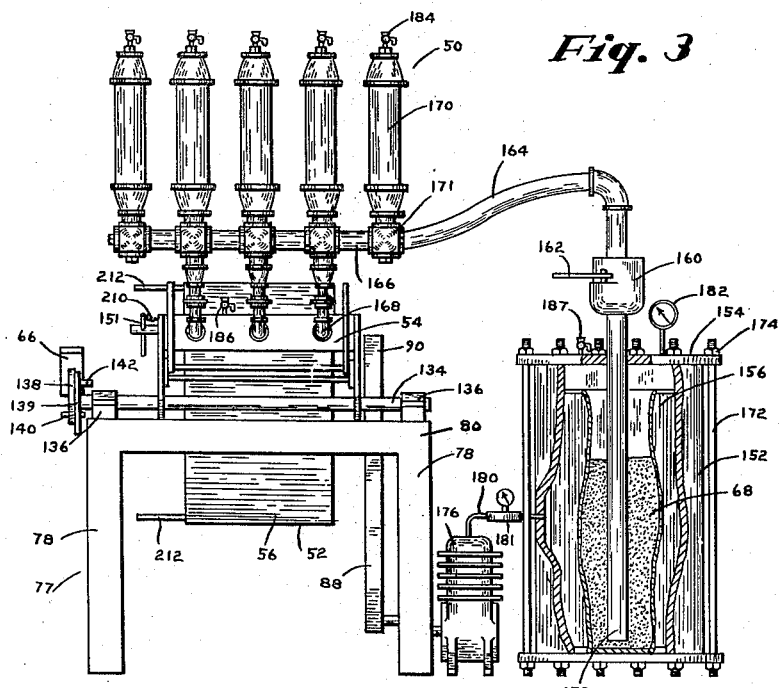
Fig. 3 is a diagrammatic end view of the embodiment of my invention shown in Fig. 1, with portions of the liquid adhesive container broken away, not in use.
Figure 4:
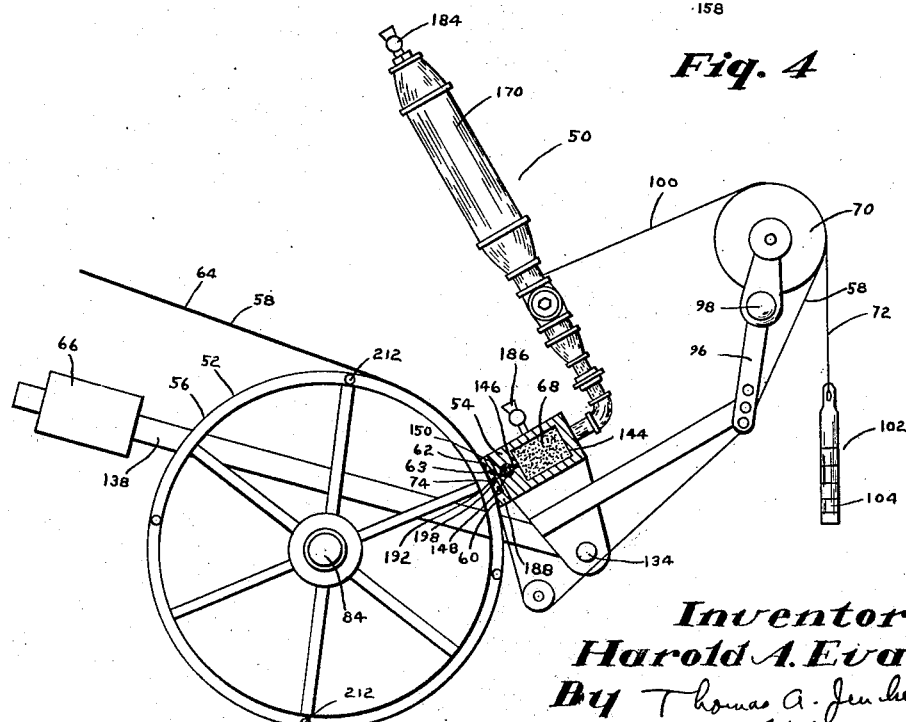
Fig. 4 is an enlarged diagrammatic side elevation illustrating how in use the pivotally mounted stationary combination fountain and ironer shown in section positively abuts the surface of the rotatable pad cylinder.
Figure 5:
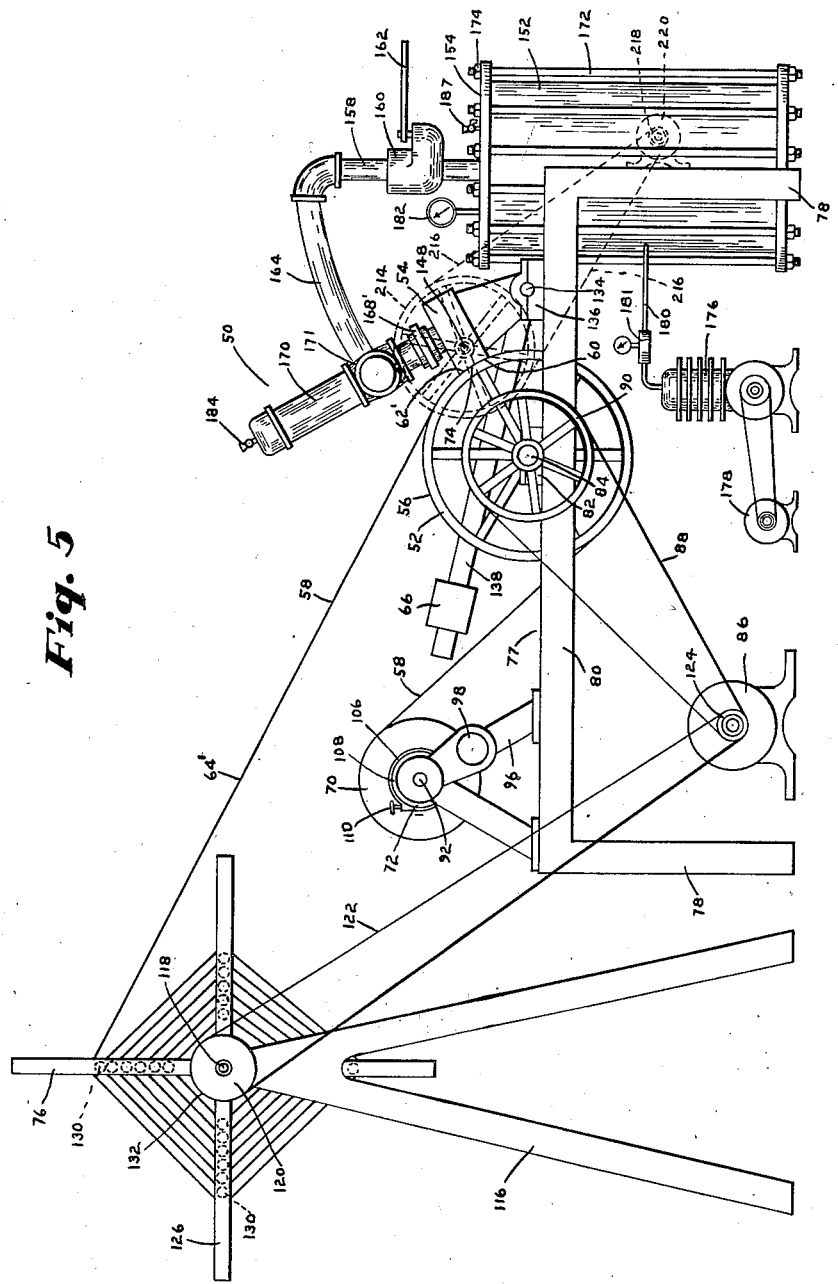
Figs. 5, 6, 7 and 8 are respectively a diagrammatic side elevation in use, a diagrammatic plan view in use, a diagrammatic end elevation not in use and a diagrammatic enlarged side elevation in use identical to Figs. 1-4 of an embodiment of my invention particularly adapted to coat commercial adhesive tape with a continuous adhesive sheet.
Figure 6:
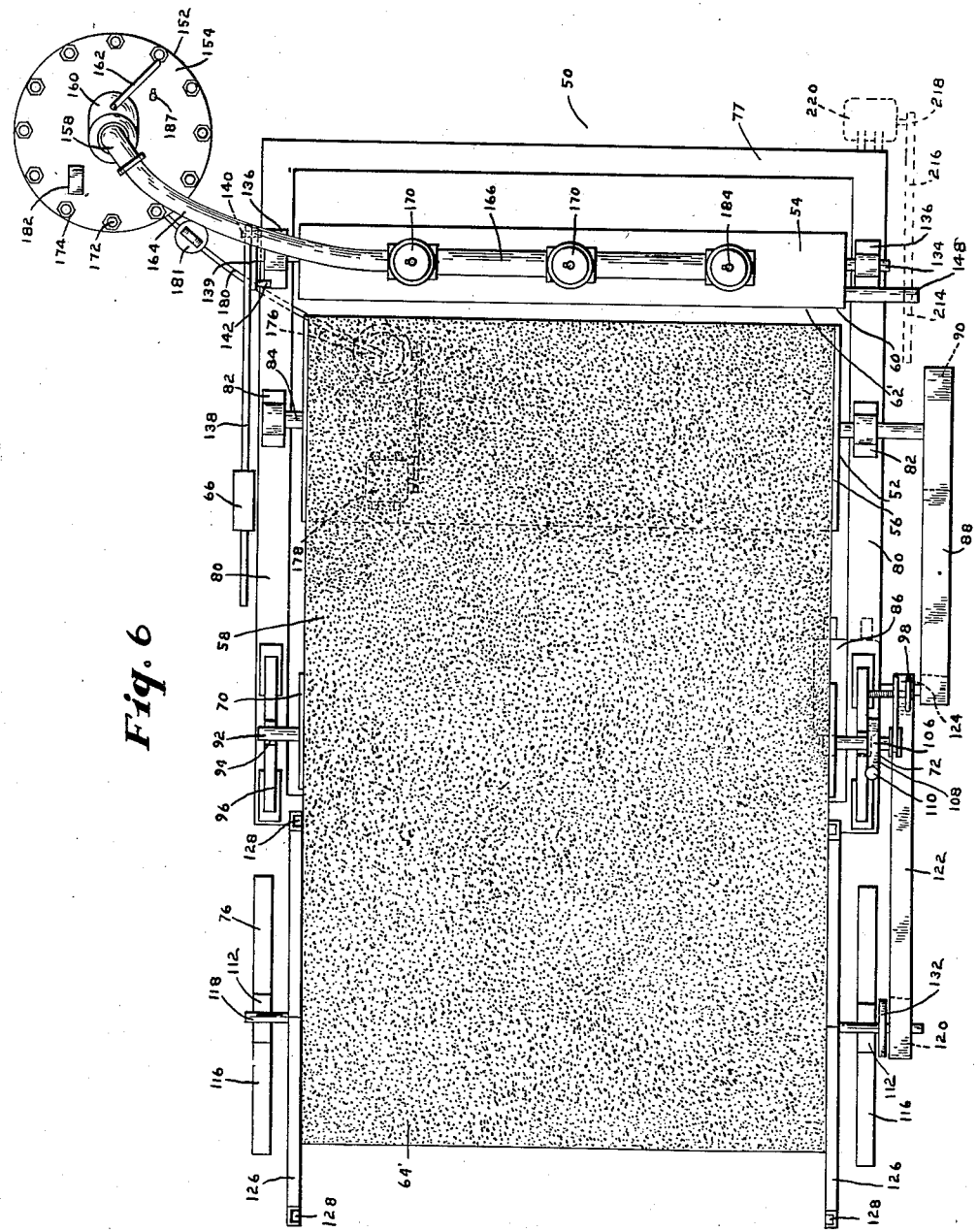
Figure 7:
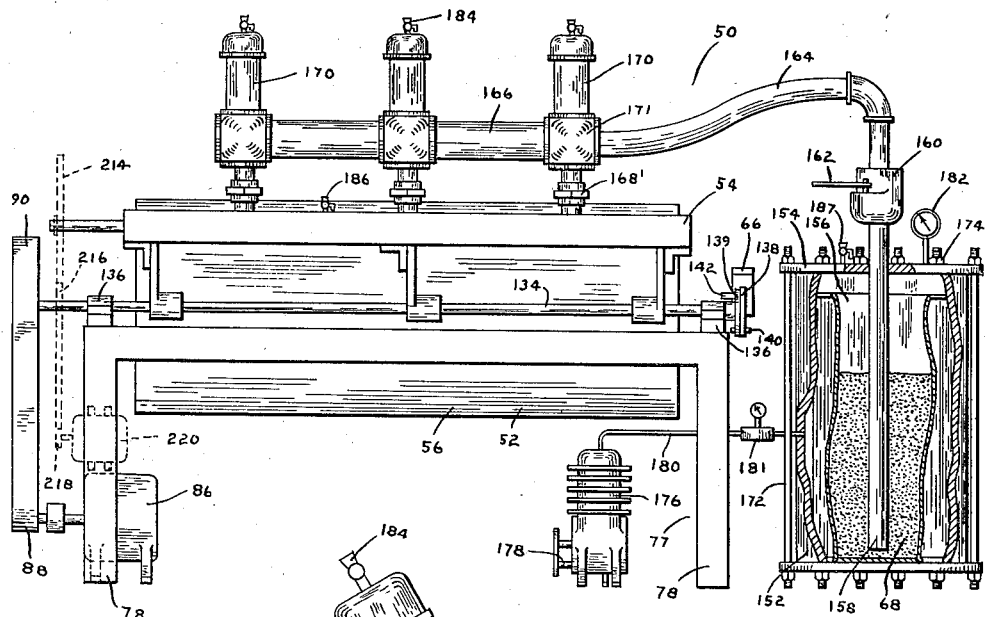
Figure 8:
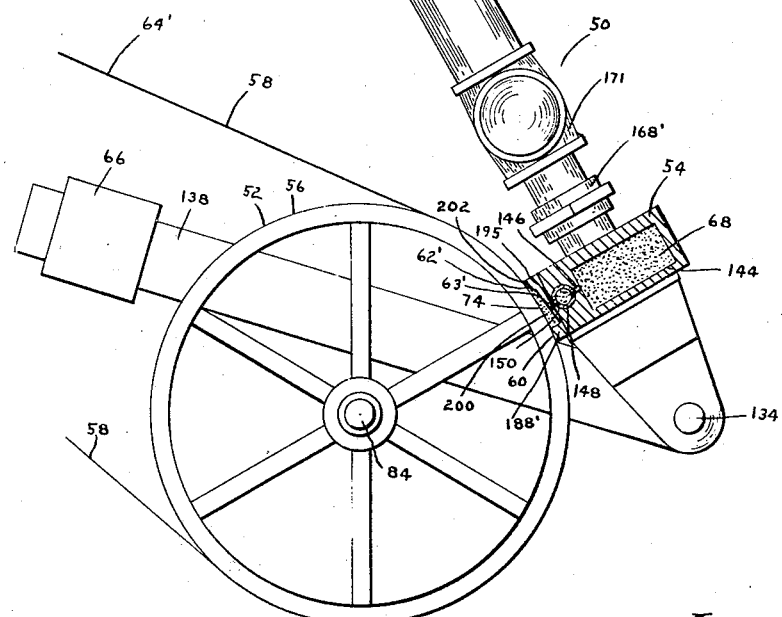
Figure 9:
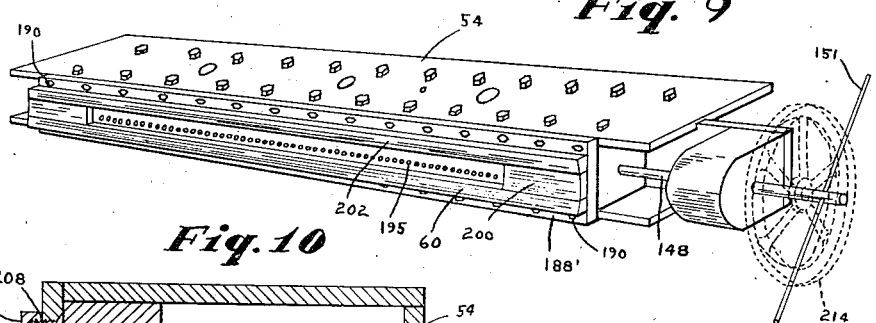
Fig. 9 is a diagrammatic perspective view showing the embodiment of combination fountain and ironer I employ in the embodiment of my invention shown in Figs. 5-8.
Figure 10:
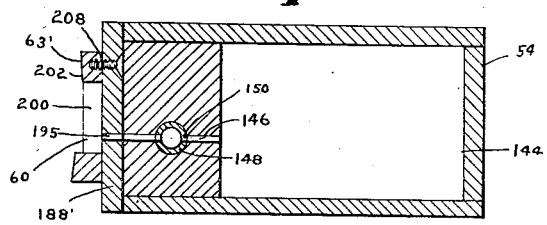
Figs. 10 and 11 are vertical sectional views taken through said combination fountain and ironer, with the structure shown in Fig. 11 being modified to produce a surface sheet of less thickness than the structure shown in Fig. 10 or to produce a total permeation of the fabric.
Figure 11:
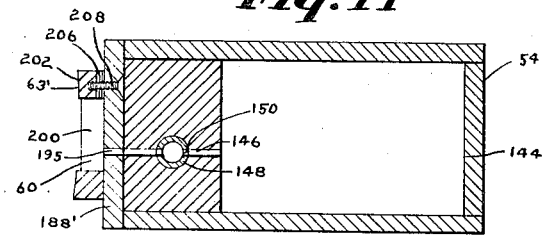
Figure 12:
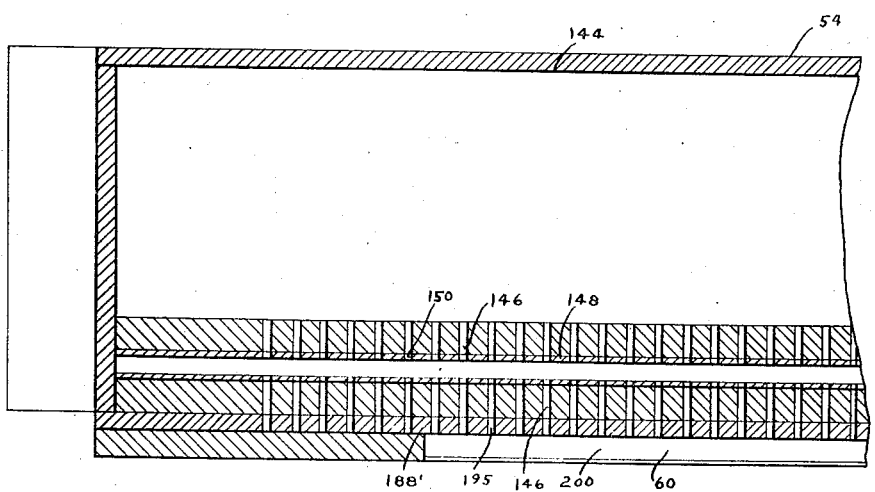
Fig. 12 is a transverse vertical sectional view taken through an end of the combination fountain and ironer shown in Fig. 9.

Figs. 19-25 illustrate an air-pervious surgical tape comprising non-bias woven fabric coated and permeated with spaced stripes by my improved machine and having the edges thereof pretreated against unraveling, Fig. 19 being a perspective view illustrating a roll of such surgical tape and showing a portion of the inner surface thereof; Fig. 20 being a perspective view of a roll of such surgical tape and showing a portion of the outer surface thereof; Fig. 21 being a diagrammatic sectional view showing the tape pretreated with my machine to provide latex stripes to prevent the edges from unraveling after a sheet of substantial width is cut to the desired tape widths shown; Fig. 22 being a sectional view similar to Fig. 21 but showing the actual threads so permeated with stripes of latex; Fig. 23 being a sectional view of the fabric shown in Fig. 22 after it has been again treated with my machine to superimpose stripes of adhesive thereon; Fig. 24 being a diagrammatic sectional view of an embodiment of completed tape showing the adhesive stripes partially permeated through the threads of the tape; and Fig. 25 being a diagrammatic view of an embodiment of completed tape showing the adhesive stripes on the surface thereof and stripes integral therewith completely permeated through the tape fabric.

Figs. 26-31 illustrate an air-pervious and conformable surgical tape comprising woven fabric cut on the bias coated and permeated with spaced stripes by my improved machine, Fig. 26 being a perspective view illustrating a roll of such surgical tape and showing a portion of the inner surface thereof; Fig. 27 being a perspective view of a roll of such surgical tape and showing a portion of the outer surface thereof; Fig. 28 being a diagrammatic sectional view of an embodiment of surgical tape showing the adhesive stripes partially permeating the fabric; Fig. 29 being a sectional view similar to Fig. 28 but showing the actual threads so partially permeated with stripes of adhesive; Fig. 30 being a diagrammatic sectional view of an embodiment of completed tape showing the adhesive stripes on the surface thereof and stripes integral therewith completely permeating the fabric; and Fig. 31 being a sectional view similar to Fig. 30 but showing the actual threads so permeated with the adhesive stripes.

Figs. 32–37 illustrate a commercial tape comprising woven fabric cut on the bias, coated and permeated with an adhesive sheet by my improved machine; Fig. 32 being a perspective view illustrating a roll of such commercial tape and showing a portion of the inner surface thereof; Fig. 33 being a perspective view of a roll of such commercial tape and showing a portion of the outer surface thereof; Fig. 34 being a diagrammatic sectional view of an embodiment of commercial tape showing the adhesive sheet partially permeating the fabric; Fig. 35 being a sectional view similar to Fig. 34 but showing the actual threads so partially permeated with a sheet of adhesive; Fig. 36 being a diagrammatic sectional view of an embodiment of completed tape showing an adhesive sheet on the surface thereof and an adhesive sheet integral therewith completely permeating the fabric; and Fig. 37 being a sectional view similar to Fig. 36 but showing the actual threads so permeated with the adhesive sheet.

Figs. 38–43 illustrate a gauze bandage coated and permeated in longitudinally spaced areas throughout the area thereof by my improved machine, Fig. 38 being a perspective view illustrating a roll of such gauze bandage and showing a portion of the inner surface thereof; Fig. 39 being a perspective view of a roll of such gauze bandage and showing a portion of the outer surface thereof; Fig. 40 being a diagrammatic sectional view of an embodiment of gauze bandage showing the longitudinally spaced adhesive areas or dots partially permeating the fabric; Fig. 41 being a sectional view similar to Fig. 40, but showing the actual threads so partially permeated with the areas or dots of adhesive; Fig. 42 being a diagrammatic sectional view of an embodiment of gauze bandage showing the adhesive areas or dots on the surface thereof and areas or dots integral therewith completely permeating the fabric; and Fig. 43 being a sectional view similar to Fig. 42, but showing the actual threads so permeated with the adhesive areas or dots.

Figs. 44–46 illustrate a stretchable creped parchmentized paper coated with an adhesive sheet by my improved machine, Fig. 44 being a perspective view illustrating a roll of such a creped parchmentized paper and showing a portion of the inner surface thereof; Fig. 45 being a perspective view of a roll of such crepe parchmentized paper and showing a portion of the outer surface thereof; Fig. 46 being a sectional view therethrough; and Fig. 47 being a sectional view through such a more intensively creped paper in which the continuous sheet of adhesive is broken at intervals by the creped mounds, thereby providing an intermittent coat.

In the drawings, wherein like characters of reference generally indicate like parts throughout, 50 generally indicates a machine for continuously permeatably adhering plastic material, preferably adhesive material to sheets, constructed in accordance with my invention. As stated hitherto, my improved machine includes a rotatable member 52 and a relatively stationary member 54. For reasons to be explained, said rotatable member preferably comprises a rotatable pad cylinder 52 having a resilient covering 56 of substantial depth constructed of rubber, resilient resin, or other suitable resilient material. The relatively stationary member 54 comprises a combination fountain and ironer preferably of greater width than the sheet 58 to be treated resting on said pad cylinder 52 to compress the sheet 58 to be coated passing over said pad cylinder 52, against said pad cylinder 52. I provide means to positively rotate said pad cylinder 52. Said combination fountain and ironer 54 compressing said sheet 58 against said pad cylinder 52 provides a drive and feed nip 74 for feeding said sheet between the relatively stationary fountain and ironer 54 and said pad cylinder 52. Said fountain 54 is provided with suitable feeding means 60 on the lower surface thereof providing passageway means 62 or 62' extending a distance longitudinally of said sheet 58 preferably of progressively decreasing height as at 63 or 63' to feed a layer of adhesive in sheet formation 64' or stripe formation 64 on said sheet 58 passing thereunder.

I also provide means to supply and adjust a supplemental weight 66 to the fountain to urge said feeding means 60 of the fountain 54 in damming relationship against the resilient surface 56 of said pad cylinder 52 and to provide a positive drive nip 74. It is obvious that the weight of the fountain 54 and the supplemental weight 66 functioning against the pad cylinder 52 continuously prevents any bleeding of the layer of adhesive on said sheet 58. I also provide means to supply liquid adhesive or other liquid plastic material 68 to said feeding means 60 under adjustably variable gaseous fluid pressure. Suitable sheet supply means such as the roll 70 is provided in front of said nip 74. Suitable means 72 are provided to adjustably brake said sheet supply means to insure that the sheet will reach the passageway 62 or 62' in a taut unwrinkled condition; said braking means 72 and said positively driven pad cylinder 52 with the fountain 54 sealing the nip 74 between said fountain and cylinder provide means to prestretch the fabric prior to the application of the liquid adhesive or other liquid plastic material thereto. I also provide sheet take up means 76 beyond said nip 74 and means to positively drive said sheet take up means at a greater mean peripheral speed than that of said pad cylinder 52 to impart, if desired, a supplemental stretch to the sheet 58 between said nip 74 and said sheet take up means 76.

As stated hitherto, my improved machine may be modified to form the layer of adhesive into a sheet 64' or 64''', spaced stripes 64 or intermittent areas 64'' at spaced intervals longitudinally of the sheet 58.

Figure 13:
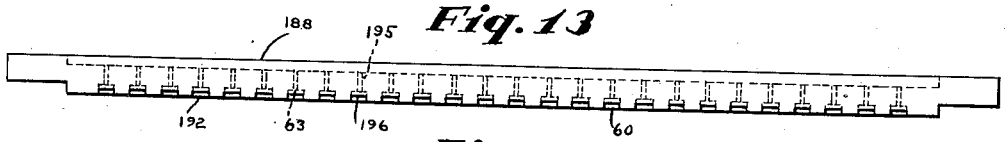
Fig. 13 is a front elevation and Fig. 14 a reverse plan view of the feed shoe I employ in the combination fountain and ironer employed in the embodiment shown in Figs. 1-4.
Figure 14:
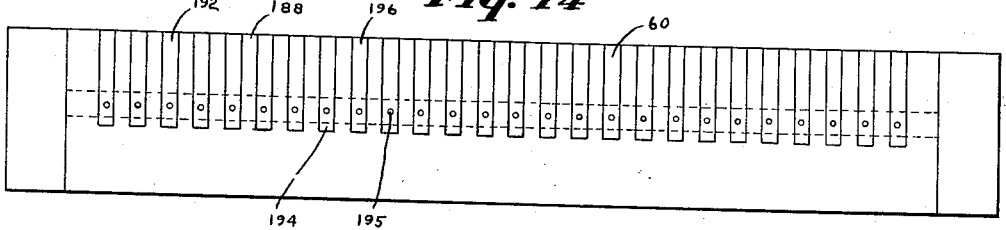
Figure 15:
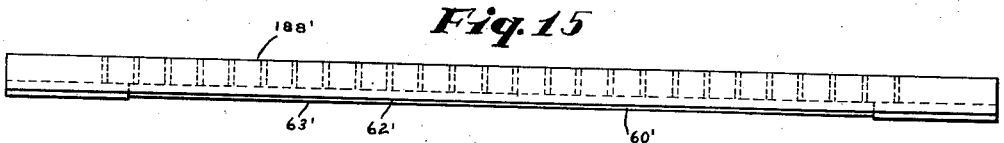
Fig. 15 is an end elevation and Fig. 16 a reverse plan view of the feed shoe I employ in the combination fountain and ironer employed in the embodiment of my invention shown in Figs. 5-8.
Figure 16:
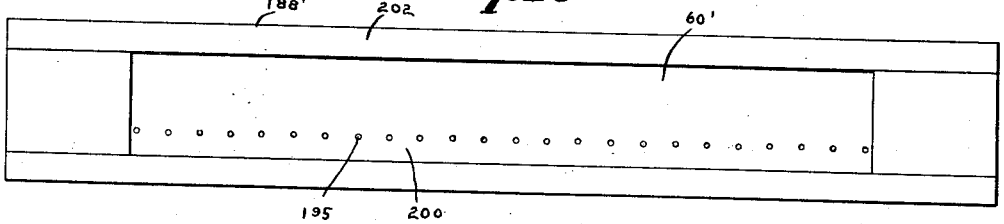
Figure 17:
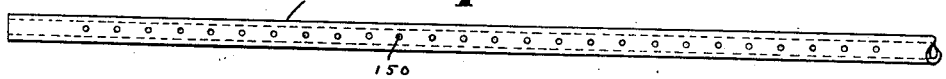
Fig. 17 is a partial front elevation of the valve shaft I may employ in the combination fountain and ironer of either embodiment.

I have shown in Figs. 1–4 a suitable type of machine for coating a layer comprising spaced stripes 64 on a sheet of fabric 58 which may comprise fabric suitable for surgical tape, such as fabric which may or may not be cut on the bias, being more stretchable if cut on the bias with the individual feed shoe therefor being shown in Figs. 13 and 14. In the embodiment of my invention shown in Figs. 5–8 I have shown a suitable machine for applying said layer in the form of a continuous sheet 64' on a suitable fabric 58 for commercial tape, comprising woven fabric also cut on the bias to be more stretchable if so desired and I have shown in Figs. 9-12 a suitable fountain for use in this machine, with the individual feed shoe therefor being shown in Figs. 15 and 16. I will first describe in detail the embodiment of my invention shown in Figs. 1-4 for the manufacture of surgical tape, and then describe how the embodiment of my invention shown in Figs. 5-8 differs therefrom.

In either embodiment, my improved machine includes a suitable skeleton frame 77 having the usual legs 78 depending therefrom for mounting on the floor. The side walls 80 of said frame are provided with suitable bearings 82 for mounting the shaft 84 of the rotatable pad cylinder 52 thereon. The means to positively rotate said pad cylinder comprises the motor 86, driving by suitable means, such as the belt 88, the pulley 90 fast on the shaft 84 of said rotatable pad cylinder 52. The sheet supply roll 70 may be suitably mounted on a shaft 92 supported on suitable bearings 94 on the upper ends of suitable brackets 96. In the embodiment shown in Figs. 1-4, said brackets 96 are rigidly attached to each side of the fountain 54, and in the embodiment shown in Figs. 5-8, said brackets 96 project rigidly upwardly from the side walls 80 of the frame. Suitable means 98 may be provided for axially adjusting the shaft 92 in said bearings 94 to accurately align the sheet 58 with the nip 74.

In the embodiment shown in Figs. 1-4, the means to adjustably brake said sheet supply means may comprise a flexible drag strap 100, attached to the fountain 54, overlying the roll of fabric 70 on said shaft 94 having a weight 102 on the lower end thereof, divided into a plurality of counter weights 104. It is apparent, therefore, that the braking effect may be adjustably varied by varying the number of counterweights on the lower end of said strap 100. In the embodiment of my invention shown in Figs. 5-8, said means 72 to adjustably brake said sheet supply means comprises an adjustable brake band 106 abutting a suitable pulley 108 on the roll shaft 92, the braking effect of which may be adjustably varied by means of the tension adjusting screw 110.

While any suitable type of a sheet take up means 76 may be provided, I have shown in both embodiments a suitable type of standard take up reel 76, in the embodiment shown in Figs. 1-4 being suitably mounted in bearings 112 on the rear end of an extension 114 projecting rearwardly from said frame 77, and in the embodiment shown in Figs. 5-8 said reel 76 is mounted on the bearings 112 on a separate standard 116 independent of the frame 77. The reel 76 comprises a driven shaft 118 having a suitable pulley 120 on one end thereof which may be driven by a suitable belt 122 from a suitable drive pulley 124 on the motor 86. The specific embodiment of reel 76 shown has the inwardly facing channel shaped spokes 126 having the inwardly facing channels 128 therein. Suitable spacer rods 130 for supporting said sheet 58 are adapted to be successively inserted within said channels 128 as the sheet 58 is wound thereon. The driven shaft 118 is provided with a suitable friction brake 132 which may slip to provide a uniform peripheral speed for the sheet 58 as the expanding effective periphery of the reel 76 caused by the successive insertion of spacing rods 130 as the fabric 58 is wound on the reel tends to increase the speed of said sheet 58. The pulleys 120 and 124 are of a suitable size to drive the reel 76 at the desired speed despite its expanding periphery. Particularly where a bias fabric is employed as the sheet 58, the peripheral speed of the reel 76 is greater than that of the pad cylinder 52 to impart a supplemental stretch to the fabric between the nip 74 and said reel 76.

The embodiment shown in Figs. 1-4 adapted to lay the layer of adhesive or other plastic material comprising the spaced strips 64 on the fabric 58 has a different specific type of combination fountain and ironer 54 from that shown in the embodiment shown in Figs. 5-8 wherein said layer comprises the sheet 64'. In both embodiments, however, said fountain 54 is provided with a pivot shaft 134 projecting transversely of the lower end thereof, the ends of which are suitably pivotally mounted on bearings 136 projecting upwardly from the side walls 80 of the frame, and the means to supply an adjustably variable supplemental weight to the pivotally mounted fountain 54 to urge the feeding means 60 in damming relationship against the resilient surface 56 of said pad cylinder 52 and to provide a positive drive means is substantially identical in both embodiments. Said means comprises the weighted lever 138 pivotally mounted on a suitable pivot pin 140 on a flange 139 rigidly mounted on said fountain shaft 134, said pivot pin 140 being normally in front of said pivot shaft 134. A movable stop pin 142 is also mounted on said flange 139 in rear of said pivot shaft 134, and when said fountain 54 is pivoted to a position abutting said pad cylinder 52, said lever 138 is adapted to abut said stop pin 142 to urge said fountain 54 against said pad cylinder 52. The weight 66 is adjustably mounted longitudinally of said lever 138 to vary the leverage exerted thereby on the fountain 54 to vary the effective pivoting gravity weight of the fountain 54 and supplemental weight 66 against the pad cylinder 52 at the nip 74. It is thus obvious that with this construction, when it is desired to raise the fountain 54 away from the pad cylinder 52 for any reason, the lever 138 supporting the weight 66 is first raised away from the stop pin 142 which may then be pushed in, permitting the lever 138 to rest in a stationary position on the cylinder shaft 84 when the fountain 54 may be readily pivoted upwardly to a raised position away from said pad cylinder 52, as shown in Figs. 2, 3, 6 and 7.

The combination fountain and ironer pivotally mounted as aforesaid is provided with a central liquid adhesive or other plastic material reservoir 144 having feed orifice means, in both embodiments providing a plurality of aligned feed orifices 146 projecting downwardly therefrom. The fountain 54 may also be provided with a valve shaft 148 extending transversely thereof below said reservoir 144. To intersect said orifice means 146, said shaft 148 is provided with diametric hole means comprising a plurality of diametric holes 150 therein, movable into and out of alignment with said orifice means 146. As stated, in both embodiments, said fountain 54 has feeding means 60 on the lower surface thereof providing passageway means 62 extending a distance longitudinally of said sheet 58 to feed a layer of adhesive or other plastic material in stripe formation 64 or in sheet formation 64' on said sheet 58 passing thereunder. If desired, a suitable handle 151 may be provided for said valve shaft 148. As stated, the particular species of feeding means 60 shown in both embodiments for feeding the layer in sheet or stripe formation comprises a separate shoe and will be later described.

As stated, I provide means to supply liquid plastic material 68 to said reservoir 144 under adjustably variable gaseous fluid pressure, which means are similar in both embodiments and will now be described. For this purpose I preferably employ a pressure cylinder 152 preferably having a removable cover 154. I also provide an open container 156 having a removable shipping cover (not shown) containing the liquid plastic material 68, said container 156 being contained within said pressure cylinder 152. The cylinder cover 154 has the supply pipe 158 projecting therethrough extending substantially to the bottom of said container 156. Said pipe 158 is provided with the valve 160 therein operated by the turning handle 162 above said cover 154. A flexible hose 164 connects the upper end of said pipe 158 to said fountain reservoir 144. In the embodiment shown, said flexible hose 164 is not connected directly to the reservoir 144 but is connected to the pipe 166 extending transversely above said fountain 54, connected to and mounted on said fountain 54 by means of spaced rigid elbow pipe fittings 168 in the embodiment shown in Figs. 1–4 and by the straight pipe fittings 168' in the embodiment shown in Figs. 5–8. To act as air cushions to transversely equalize the pressure, I suitably operatively connect a plurality of suitably spaced air cushioning domes 170 by means of the pipe fittings 171 to said pipe 166. I provide means capable of standing a high compression to detachably secure said pressure cylinder cover 154 to said pressure cylinder 152, in the preferred embodiment shown, comprising the vertical tie rods 172 having removable nuts 174 on the upper end thereof.

I also supply a source of gaseous fluid under adjustable compression connected to said pressure cylinder 152 exterior of said container 156, in my preferred embodiments, comprising the air compressor 176 suitably driven by the motor 178 and discharging by means of the pipe 180 within the pressure cylinder 152 exterior of said container 156. The pressure cylinder 152 is provided with the pressure gauge 182 and an adjustable diaphragm valve regulator 181 is provided in the pipe 180. It is thus obvious that fluid pressure compresses the liquid plastic material 68 downwardly within said container 156 and forces it upwardly through the pipe 158, the flexible hose 164, the pipe 166, and the couplings 168 to the liquid reservoir 144. The air domes 170 are provided to catch air bubbles entrained with the liquid plastic material 68 as it is urged into the liquid reservoir 144, which is at all times maintained in a full position by the fluid pressure from the compressor 176. Said domes 170 tend to catch individual air bubbles and maintain the pressure equally throughout the width of said reservoir 144. If desired, individual domes 170 may be provided with petcocks 184 for releasing the air entrained therein, and also if desired, a supplemental petcock 186 may be provided in the upper wall of the fountain 54 to supplementally release entrained air from the reservoir 144. The pressure cylinder 152 is also provided with a petcock 187 to release or lower the air pressure therein. It is thus obvious that with this construction the liquid plastic material 68 is continuously fed to said feeding means 60 under substantial adjustably variable fluid pressure.

As stated hitherto, the embodiment shown in Figs. 1–4 is adapted to lay spaced stripes 64 of plastic material on the sheet 58, as in embodiments of finished articles shown in Figs. 19–31 and the embodiment shown in Figs. 5–8, is adapted to lay a single sheet 64' of plastic material on said sheet 58 as in the embodiment of finished article shown in Figs. 32–37. This variation is accomplished by variations in the shape of the feeding means 60, which in the embodiment shown comprises a detachable feed shoe 188 or 188' detachably securable to the lower end of said fountain 54 in any suitable manner, such as by the cap screws 190. In the embodiment shown in Figs. 1–4, 13 and 14, the feed shoe 188' is provided with a plurality of aligned liquid plastic material feeding and compacting grooves 192 on the lower surface thereof overlying said sheet 58, commencing substantially adjacent the center of the feed shoe 188 and discharging at their outlet ends 196 in the direction of movement of said pad 58. Said grooves 192 are of less cross-sectional area than that of the shoe orifices 195 discharging at the inlet ends 194 of said grooves, said shoe orifices being of the same diameter and aligned with the fountain orifices 146. Said grooves 192 are preferably of progressively decreasing height, being downwardly tapered for this purpose, as shown at 63, towards their outlet ends 196 to force said liquid plastic material in spaced stripes 64 within said sheet 58 and to provide aligned spaced stripes 65 within said sheet and to provide aligned spaced stripes 64 of adhesive on the surface of said sheet 58 integral with said permeated spaced stripes 65.

In the embodiment of my invention shown in Figs. 5–8 and Figs. 15 and 16, adapted to apply a sheet 64' of liquid plastic material to said continuous sheet 58, the feed shoe 188' is also detachably secured to the lower end of said fountain by the cap screws 190 and is provided on its lower surface with the centrally inset feed portion 200 into which the lower ends of the shoe orifices 195 aligned with the fountain orifices 146 discharge. I also provide an adjustable pressure plate 202 tapering downwardly to the outlet end 196 as at 63' to be of progressively increasing height beyond said feed portion to provide the plastic material sheet discharge slot 62' of progressively decreasing height discharging in the direction of movement of said sheet 58 and pad 52 to force said liquid plastic material 68 in sheet form 65' within said sheet and to provide a plastic sheet 64' integral with said permeated plastic sheet 65' on the surface thereof. If desired, the height of the pressure plate 202 may be adjustably varied in any suitable manner, such as by mounting the desired number of thin shims 206 underneath it even to a height to abut said pad cylinder 52 to provide an impregnating or permeating machine which will permeate the fabric without leaving a surface coat. The pressure plate 202 may be secured to the lower surface of said shoe 188' by means of the screws 208, said shims 206 where employed being provided with suitable holes for receiving said screws.

As stated, I have provided a suitable rotatable valve shaft 148 having the handle 151 for bringing the orifices 150 thereof into and out of alignment with said orifices 146 to provide a shut-off valve for said fountain. If it be desired to apply intermittent longitudinally spaced areas of adhesive or other plastic material 64 on said sheet 58, spring means 210 may be provided having one end thereof attached to said handle 151 and the other end thereof secured to said fountain 54 to normally urge said valve shaft 148 to a position closing said orifices 146. To urge the valve shaft 148 to a position permitting discharge through said orifices 146-195 to feed intermittent lengths 64 of plastic material onto the sheet 58, I may mount suitable means, such as the spot cam pins 212, at predetermined adjustably spaced intervals adjacent the periphery of said pad cylinder 52 to rotate therewith to abut said valve shaft handle 151 to rotate said valve shaft 148 to open said orifices 146-195 for a predetermined time interval to feed predetermined lengths 64 of plastic material on each revolution of said pad cylinder 52, as shown in the embodiment shown in Figs. 1-4.

Figure 18:
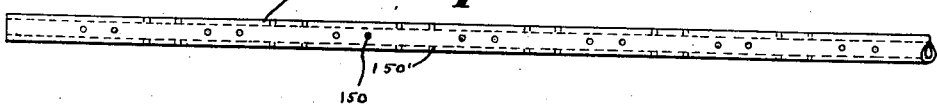
Fig. 18 is a partial front elevation illustrating an alternative type of valve shaft I may employ in the combination fountain and ironer of either embodiment which may be continuously rotated in use to provide an intermittent feed to provide longitudinally spaced areas of plastic material on the sheet treated.

If it be desired to provide continuously spaced staggered areas 64" of plastic material throughout the length of said sheet 58, as in the embodiments of finished sheets shown in Figs. 38-43, as shown in Fig. 18, the alternate orifices 150 may be drilled at right angles to adjacent orifices 150' and the thus modified valve shaft 148 revolved continuously by means of mounting the drive pulley 214 thereon which may be driven continuously by a belt 216 driven by a suitable pulley 218 rotated by a suitable motor 220 to feed said liquid material 68 in equally spaced areas 64" on said sheet 58.

If it be desired to apply a continuous sheet 64' of plastic material to the sheet 58, as in the embodiment shown in Figs. 5-8, the reel 76 is suitably mounted in the standard 116 and the sheet supply means comprising a roll of sheet material 70 is suitably mounted on its supporting brackets 86, the sheet 58 suitably threaded around the pad cylinder 52 and led and affixed to a suitably spacing rod 130 of the reel 76. The fountain 54 may then be pivoted from the open position shown in Figs. 6 and 7 to the closed position shown in Figs. 5 and 8, with the feeding means 60 thereof abutting the sheet 58 passing over said pad cylinder 52. The valve handle 151 may then be turned to permit the flow of fluid to the feeding means 60 and the valve handle 162 may be opened to permit the flow of liquid plastic material 68 to the reservoir 144. The diaphragm valve regulator 181 is set to the desired amount of pressure and automatically controls the motor 178 in a manner not shown to run the air compressor 176 independent of the machine 50 requisite amounts to maintain the pressure up to the set level. The lever 138 may then be raised and the plug 142 inserted to hold said lever 138 bearing the counter weight 66 in a raised position. When the pressure gauge registers the desired amount of pressure the drive motor 86 may be started which will positively drive the pad cylinder 52 and the reel 76, causing the sheet to be drawn from the supply means 70 and reeled up on the reel 76, the liquid and gravity pressure forcing the liquid plastic material 68 through the fountain 54, the feeding means 60 and the feed slot 62' to deposit it in a sheet 64' on the fabric, the feed slot 62' being of progressively decreasing height as at 63' and the fluid pressure will force the sheet 64' of liquid plastic material not only upon the surface of the fabric, but also to provide an integral sheet 65' permeated within said fabric if the fluid pressure and gravity pressure are properly adjusted. If desired, the pad cylinder 52 may be run at such a speed and the braking means 72 so adjusted as to cause an initial stretch between the feed roll 70 and the nip 74 in the sheet 58, and if desired the speed of the reel 76 may be adjusted relative to the speed of the pad cylinder 52 as to provide a supplemental stretch in said sheet 58 between the nip 74 and said reel 76. If it is desired to completely permeate the plastic material 68 within said sheet, the fluid pressure and gravity pressure may be progressively increased and the pressure plate 202 made of a height to abut the pad cylinder 52 to make the device function like an impregnating machine, and if it be merely desired to lay a coated sheet of liquid plastic material 68 on said sheet 58 without any permeation or impregnation thereof, as in a calender or spreading machine the fluid and gravity pressures are so adjusted as not to permeate the fabric with plastic material and the grooves or the lower edge of the pressure plate are not downwardly tapered as at 63 or 63'. I believe I am the first, however, to provide a machine which will simultaneously in a single integral layer, coat and at least partially permeate the fabric with the same integral layer. The braking means 72 may be suitably varied by adjustment of the adjusting screw 110 and the supplemental weight applied to the fountain may be varied by moving the weight 66 along the lever 138. The fluid pressure may be varied by varying the setting of the diaphragm valve regulator 181. Should it be desired to coat a layer comprising evenly longitudinally spaced areas or dots on said fabric as in the embodiment shown in Figs. 38-43, the pulley 214 is mounted on the shaft 148 and the supplemental motor 220 started to continuously rotate the shaft 148 for this purpose.

The embodiment shown in Figs. 1-4 is operated in exactly similar fashion, the coated or impregnated layer 64, however, in this instance, due to the construction of the fountain feed shoe 188 comprising spaced stripes 64. Variations in the braking means applied to the feed roll 70 in this instance, however, are made by varying the number of the counter weights 104. If it be desired to apply the coating in longitudinally spaced areas 64", the spring 210 may be attached to the handle 151 and the cam pins 212 mounted at spaced intervals adjacent the periphery of the pad cylinder 52. If the fabric is stretched while being coated or permeated, it is obvious that the sheet 58 is wound on the reel 76 in a stretched condition, and that reels 76 containing the so stretched fabric may be detachably removed from said machine to a suitable drying or conditioning room for the desired drying or conditioning interval. It is obvious that the fluid pressure must be so regulated as to be not greater than the gravity pressure causing the fountain 54 to bear against the pad cylinder 52 so as to cause a bleeding or leakage of liquid adhesive around the edges of said fountain or a complete blowout of liquid adhesive at this point.

As stated, my improved machine is adapted to apply plastic material to a fabric either to lay a surface coating in stripe formation 64 or in sheet formation 64' on the same, or to impregnate the fabric with spaced stripes of plastic material 65 or with a permeated sheet 65'. I have also explained how it is possible to change my machine from a coating machine into an permeating machine by variations in the feeding means 60 and by varying the amount of fluid pressure applied to the liquid adhesive to provide for the first time a machine capable of applying in a single coat both a permeated layer and a surface covering integral therewith. My machine may be employed for coating or permeating the fabric with any suitable type of plastic. It is preferably employed for applying or affixing an adhesive to the fabric, which adhesive may be applied hot or in a solvent, preferably in a solvent to provide when affixed a pressure sensitive adhesive. It is obvious, however, that any other type of a plastic material may be applied by my machine, such as any suitable type of thermo-plastic or thermo-setting material, or artificial resin, cellulose acetate, pyroxylin, Celluloid, paint, glue, etc.

Figs. 19–47 illustrate various types of articles comprising continuous sheets coated or permeated by my improved machine. I have shown in Figs. 19–25 an air pervious surgical tape 222 comprising non-bias cut woven fabric coated with the spaced adhesive stripes 64 and permeated with the spaced adhesive stripes 65 integral therewith by my improved machine, cut into suitable widths for surgical tape and having the edges 224 thereof pretreated against unraveling. This may be done by passing the sheet of fabric 58 twice through my improved machine, in the first instance applying the wide stripes 226 of normal latex in liquid form thereto. This may be done in either type of machine, in the embodiment shown in Figs. 1–4 or in the embodiment shown in Figs. 5–8, by inserting spaced blocks longitudinally of the centrally inset portion 200. The fabric 58 may then be passed a second time through the machine employing the embodiment shown in Figs. 1–4 to apply the narrow adhesive stripes 64 on the surface of the fabric integral with the narrow adhesive stripes 65 permeated at least partially through the fabric, in the embodiment shown in Fig. 24 being partially permeated through and in the embodiment shown in Fig. 25, said adhesive stripes 65 being substantially totally permeated through the fabric. It is obvious that I have provided a novel type of non-bias cut surgical tape having longitudinally extending warp threads 228 and the transverse weft or filling threads 230 of the fabric, covering the exposed ends of the filling threads and the warp threads adjacent said edges to prevent them from unravelling. The latex stripes 226 may be cut to provide said areas 232 adjacent said edges. In making this fabric, enough tension only is applied to the sheet supply means 70 to keep the sheet taut up to the nip 74 and the sheet take up means 76 is only driven at a sufficiently greater peripheral speed than that of the pad cylinder 52 to keep the sheet in tension at all times between the nip 74 and the tape-up reel 76 without applying any positive stretch to the fabric, either between the sheet supply means 70 and the nip 74 or the nip 74 and the take-up reel 76. This type of structure, however, forms a desirable surgical tape as there are open spaces between the stripes which permit the ready passage of air and liquid medicament to the wound bandaged.

I have shown in Figs. 26–31 an alternative embodiment of my invention comprising an air pervious and conformable surgical tape 234 to which the pressure sensitive adhesive employed in the embodiment shown in Figs. 19–25 is also employed in stripe formation, preferably with the coated stripes 64 and the permeated stripes 65 integral therewith. In this instance I preferably employ a conformable surgical tape cut on the bias, both the warp threads 228 and the filling threads 230 running diagonally away from the edges, the respective angles of obliquity formed by the threads depending on the amount of stretching given to the fabric. This bias cut fabric 234 is preferably prestretched a large portion of its stretchable amount up to its elastic limit before passing through my machine. In this instance I preferably apply a second stretching between the feed roll 70 and the nip 74 to open up the interstices between the threads so that they receive a large amount of adhesive and to insure that the fabric will pass through the nip evenly. A supplemental stretch is also preferably given to the fabric as it passes from the nip 74 to the take-up reel 76, all of said stretches, however, being substantially less than the elastic limit of the fabric. The fabric is then conditioned or dried on the reel 76 while in a stretched condition, the solvent leaving voids in the stripes so that when the fabric is removed from the reel 76 the continuous rubber stripes will tend at all times to make the fabric elastically contractible. Inasmuch, however, as the adhesive in the stripes is preferably elastically expansible, it is obvious that the fabric may stretch in use as it is being applied to a wound or other object up to its elastic limit, with the elastically contractible stripes 64 and 65 so covering and permeating the fabric as to tend to return said then stretched fabric sheet substantially to its just previous unstretched condition so that after it is applied to an object the fabric will tend to contract to tightly bind against the object, thus if a bandage be employed in association therewith, firmly clamping the bandage to the wound and the parts of the wound itself together. In the embodiment shown in Figs. 28 and 29 the stripes 65 are only permeated part way through the fabric, whereas in the embodiment shown in Figs. 30 and 31, said stripes 65 are permeated all the way through.

I have shown in Figs. 32–37 my invention applied to a so-called commercial or masking tape 236 which is also preferably cut on the bias and prestretched prior to passage through my machine. The fabric is identically treated as the fabric in the embodiment shown in Figs. 26–31, only it is passed through the continuous sheet coating machine shown in Figs. 5–8 instead of the strip coating machine shown in Figs. 1–4. This type of fabric may be employed in any place where so-called commercial or masking tape is employed, either for true masking in painting or spraying, or as a binder, reinforcement or otherwise. In the embodiment of my invention shown in Figs. 34 and 35, the sheet 65' is permeated partially through the fabric, whereas in the embodiment of my invention shown in Figs. 36 and 37, the sheet 65' is permeated substantially through the fabric.

I have shown in Figs. 38–43 an embodiment of my invention comprising non-bias woven gauze fabric 238 which may be employed for bandages or other uses having longitudinally spaced intermittent areas 64'' of adhesive on the surface thereof and/or the similar longitudinally spaced permeated areas 65'' which may be formed as single integral layers with the coated areas 64''. This type of fabric may be made by employing the rotatable feed rod 148' shown in Fig. 18 in either embodiment of my invention, namely the stripe forming embodiment shown in Figs. 1–4 or the sheet forming embodiment shown in Figs. 5–8. The attachment for continuously rotating said rod 148' I have shown in Figs. 5, 6, 7, and 9. It is apparent, however, that if desired such longitudinally spaced areas of adhesive whether coated, impregnated, or both, may be employed on the bias cut stretched fabric of the type shown in Figs. 26–37. In the embodiment actually shown in Figs. 38–43 I have preferably employed a gauze 238 or open fabric in which the warp threads 228, and filling threads 230 are widely spaced so as to be readily air pervious, it being apparent that with such a fabric it may be employed directly as a bandage material without the use of surgical tape. In the embodiment of my invention shown in Figs. 40 and 41, said areas 65″ are permeated part way through the fabric, and in the embodiment of my invention shown in Figs. 42 and 43 they are permeated all the way through the fabric.

As stated, my improved machine may be employed for coating any suitable type of sheet material, and I have shown in Figs. 44–47 a sheet material 240 comprising a standard type of stretchable creped parchmentized paper base 242 having the creped mounds 244 therein and having the sheet 64‴ of adhesive material applied thereto by my improved machine. The specified type of coated creped paper 240 shown is stretchable, and it is apparent that the coated sheet 64‴ also functions in similar manner to the coated sheet shown in Figs. 32–37 and the coated stripes shown in Figs. 26–31 to elastically contract when stretched in use to tend to return the composite sheet 240 substantially to its pre-stretched condition. If desired, the paper base 242 may be more intensively creped to provide the high mounds 244 and greater elasticity as shown in Fig. 47, and it is then apparent if a continuous sheet 64‴ of adhesive be applied thereto by my improved machine, said continuous sheet is broken at intervals by the creped mounds 244, thereby providing an intermittent coat.

It is apparent, however, that the base sheet 58 may comprise any suitable material, fabric, paper, plastic or otherwise, and that the coated or impregnated layer or layers may also comprise any suitable plastic material, in the typical example shown, preferably comprising a pressure sensitive adhesive.

It is apparent, therefore, that I have provided a novel type of machine for making the various described and other types of articles, which may be employed as a coating or impregnating machine, or a combined coating or impregnating machine, with the structural and other advantages hitherto set forth.

In the claims I refer to the front portion of the lower surface of the combination fountain and ironer as the portion thereof which bears first against the fabric passing over the surface of the pad cylinder prior to any feeding of coating plastic material thereon.

It is understood that my invention is not limited to the specific embodiments shown and that various deviations may be made therefrom without departing from the spirit and scope of the appended claims.

What I claim is:

1. A machine for continuously permeatably affixing plastic material to sheets comprising a rotatable pad cylinder having a resilient covering of substantial depth, means to positively rotate said pad cylinder, a combination fountain and ironer of greater width than said sheet having a front portion resting on said pad cylinder to compress a sheet to be covered passing over said pad cylinder against said pad cylinder and to provide a drive and sheet feed nip and having coating plastic material feeding means on the lower surface thereof in rear of said front sheet compressing and hence sheet feeding portion providing passageway means extending a distance longitudinally of said sheet of progressively decreasing height to feed plastic material on said sheet passing thereunder, means to supply an adjustably variable supplemental weight to the fountain to urge said feeding means in damming relationship against the resilient surface of said pad cylinder and to provide a positive drive nip, means to supply plastic material to said feeding means under adjustably variable gaseous fluid pressure, sheet supply means in front of said nip, means to adjustably brake said sheet supply means, sheet take-up means beyond said nip and means to positively drive said sheet take-up means at a greater peripheral speed than that of said pad cylinder.

2. A machine for continuously permeatably affixing plastic material to sheets comprising a rotatable pad cylinder having a resilient covering of substantial depth, means to positively rotate said pad cylinder, a combination fountain and ironer of greater width than said sheet having a front portion resting on said pad cylinder to compress a sheet to be covered passing over said pad cylinder against said pad cylinder and to provide a drive and sheet feed nip and having coating plastic material feeding means on the lower surface thereof in rear of said front sheet compressing and hence sheet feeding portion providing passageway means extending a distance longitudinally of said sheet to feed plastic material on said sheet passing thereunder, means to supply supplemental weight to the fountain to urge said feeding means in damming relationship against the resilient surface of said pad cylider and to provide a positive drive nip, means to supply liquid plastic material to said feeding means under gaseous fluid pressure, sheet supply means in front of said nip, means to brake said sheet supply means and sheet take-up means beyond said nip.

3. A machine for continuously permeatably affixing plastic material to sheets comprising a rotatable pad cylinder having a resilient covering of substantial depth, means to positively rotate said pad cylinder, a combination fountain and ironer of greater width than said sheet having a front portion resting on said pad cylinder to compress a sheet to be covered passing over said pad cylinder against said pad cylinder and to provide a drive and sheet feed nip and having coating plastic material feeding means on the lower surface thereof in rear of said front sheet compressing and hence sheet feeding portion providing passageway means extending a distance longitudinally of said sheet of progressively decreasing height to feed plastic material on said sheet passing thereunder, means to supply supplemental weight to the fountain to urge said feeding means in damming relationship against the resilient surface of said pad cylinder and to provide a positive drive nip, means to supply liquid plastic material to said feeding means under gaseous fluid pressure, sheet supply means in front of said nip, means to brake said sheet supply means and sheet take-up means beyond said nip.

4. A machine for continuously permeatably affixing plastic material to sheets comprising a rotatable pad cylinder having a resilient covering of substantial depth, means to positively rotate said pad cylinder, a combination fountain and ironer of greater width than said sheet having a front portion resting on said pad cylinder to compress a sheet to be covered passing over said pad cylinder against said pad cylinder and to provide a drive and sheet feed nip and having coating plastic material feeding means on the lower surface thereof in rear of said front sheet compressing and hence sheet feeding portion providing passageway means extending a distance longitudinally of said sheet to feed plastic material on said sheet passing thereunder, means to supply supplemental weight to the fountain to urge said feeding means in damming relationship against the resilient surface of said pad cylinder and to provide a positive drive nip, means to supply liquid plastic material to said feeding means under gaseous fluid pressure, sheet supply means in front of said nip, means to adjustably brake said sheet supply means, sheet take-up means beyond said nip and means to positively drive said sheet take-up means at a greater peripheral speed than that of said pad cylinder.

5. A machine for continuously permeatably affixing plastic material to sheets, comprising a rotatable pad cylinder having a resilient covering of substantial depth, sheet supply means, means to positively rotate said pad cylinder to draw a sheet to be covered thereover, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, a valve shaft extending transversely of said fountain to intersect said orifice means having diametric hole means therein movable into and out of alignment with said orifice means and having feeding means on the lower surface providing passageway means extending a distance longitudinally of said sheet to feed plastic material on said sheet passing thereunder, means to apply supplemental weight to the fountain to urge said feeding means in damming relationship against the resilient surface of said pad cylinder and to provide a positive drive nip, a source of liquid plastic material supply connected to said fountain reservoir, a source of gaseous fluid under compression connected to the source of liquid plastic material supply, a handle for said valve shaft, spring means normally urging said valve shaft handle to a position closing said orifice means and means mounted on said pad cylinder to rotate therewith to abut said valve shaft handle to open said orifice means for a predetermined time interval on each revolution of said pad cylinder.

6. A machine for continuously permeatably affixing plastic material to sheets, comprising a rotatable pad cylinder having a resilient covering of substantial depth, sheet supply means, means to positively rotate said pad cylinder to draw a sheet to be covered thereover, sheet take-up means, a combination fountain and ironer of greater width than said sheet having a front portion resting on said pad cylinder to overlyingly abut and compress said sheet against said pad cylinder to provide a drive and sheet feed nip, a central liquid adhesive reservoir having feed orifice means projecting downwardly therefrom in rear of said front sheet compressing and hence sheet feeding portion, a valve shaft extending transversely of said fountain to intersect said orifice means having diametric hole means therein movable into and out of alignment with said orifice means and having feeding means on the lower surface providing passageway means extending a distance longitudinally of said sheet to feed plastic material on said sheet passing thereunder, means to supply supplemental weight to the fountain to urge said feeding means in damming relationship against the resilient surface of said pad cylinder and to provide a positive drive nip, a source of liquid plastic material supply connected to said fountain reservoir, a source of gaseous fluid under compression connected to the source of liquid plastic material supply, and means to continuously rotate said valve shaft to intermittently supply liquid plastic material to said feeding means.

7. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having a plurality of aligned feed orifices projecting downwardly therefrom in rear of said front sheet compressing and hence sheet feeding portion, a plurality of aligned liquid plastic material feeding and compacting grooves therein overlying said sheet commencing substantially adjacent the center thereof and discharging in the direction of movement of said sheet of lesser cross-sectional area than said orifices discharging therein at the inlet ends thereof and of progressively decreasing height to force said plastic material in spaced stripes within said sheet and to provide aligned spaced stripes of plastic material on the surface thereof integral with said permeated spaced stripes, means to supply supplemental weight to the fountain to urge said feed grooves in damming relationship against the resilient surface of said pad cylinder and to provide a positive drive nip, a source of liquid plastic material supply connected to said fountain reservoir, and a source of gaseous fluid under compression connected to the source of liquid plastic material supply whereby said liquid plastic material may be applied to said sheet in spaced stripes under heavy gravity and fluid pressure through channels of progressively decreasing area to cause said spaced stripes to at least partially permeate said sheet.

8. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having a plurality of aligned feed orifices projecting downwardly therefrom in front of said front sheet compressing and hence sheet feeding portion, a plurality of aligned liquid plastic material feeding and compacting grooves therein overlying said sheet commencing substantially adjacent the center thereof and discharging in the direction of movement of said sheet of lesser cross-sectional area than said orifices discharging therein at the inlet ends thereof to provide aligned spaced stripes of plastic material on the surface of said sheet, means to supply supplemental weight to the fountain to urge said feed grooves in damming relationship against the resilient surface of said pad cylinder and to provide a positive drive nip, a source of liquid plastic material supply connected to said fountain reservoir, and a source of gaseous fluid under compression connected to the source of liquid plastic material.

9. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having a plurality of aligned feed orifices projecting downwardly therefrom in front of said front sheet compressing and hence sheet feeding portion, a valve shaft extending transversely of said fountain to intersect said orifices having a plurality of diametric holes therein movable into and out of alignment with said orifices, a feed shoe detachably securable to the lower end of said fountain having a plurality of aligned liquid plastic material feeding and compacting grooves therein overlying said sheet commencing substantially adjacent the center thereof and discharging in the direction of movement of said sheet of lesser cross-sectional area than said orifices discharging therein at the inlet ends thereof and of progressively decreasing height to force said plastic material in spaced stripes within said sheet and to provide aligned spaced stripes of plastic material on the surface thereof integral with said permeated spaced stripes, means to supply supplemental weight to the fountain to urge said feed grooves in damming relationship against the resilient surface of said pad cylinder and to provide a positive drive nip, a source of liquid plastic material supply connected to said fountain reservoir, and a source of gaseous fluid under compression connected to the source of liquid plastic material supply whereby said liquid plastic material may be applied to said sheet in spaced stripes under heavy gravity and fluid pressure through channels of progressively decreasing area to cause said spaced stripes to at least partially permeate said sheet.

10. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, said fountain having on its lower surface a centrally inset feed portion and an adjustable pressure plate of progressively increasing height beyond said feed portion providing a sheet discharge slot of progressively decreasing adjustable height discharging in the direction of movement of said sheet to force said plastic material in sheet form within said sheet and to provide a sheet of plastic material integral with said permeated adhesive sheet on the surface thereof, means to supply supplemental weight to the fountain to urge said fountain in damming relationship against the resilient surface of said pad cylinder and to provide a positive drive nip, a source of liquid plastic material supply connected to said fountain reservoir, and a source of gaseous fluid under compression connected to the source of liquid plastic material supply whereby said liquid plastic material may be applied to said sheet in sheet form under heavy gravity and fluid pressure through a passage of progressively decreasing height to cause said sheet of plastic material to at least partially permeate said fabric sheet.

11. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, a valve shaft extending transversely of said fountain to intersect said orifice means having diametric hole means therein movable into and out of alignment with said orifice means, a feed shoe detachably securable to the lower end of said fountain having on its lower surface a centrally inset feed portion and an adjustable pressure plate of progressively increasing height beyond said feed portion providing a sheet discharge slot of progressively decreasing adjustable height discharging in the direction of movement of said sheet to force said plastic material in sheet form within said sheet and to provide a sheet of plastic material integral with said permeated sheet on the surface thereof, means to supply supplemental weight to the fountain to urge said feed shoe in damming relationship against the resilient surface of said pad cylinder and to provide a positive drive nip, a source of liquid plastic material supply connected to said fountain reservoir, and a source of gaseous fluid under compression connected to the source of liquid plastic material supply whereby said plastic material may be applied to said sheet in sheet form under heavy gravity and fluid pressure through a passage of progressively decreasing height to cause said sheet of plastic material to at least partially permeate said sheet.

12. A machine for continuously permeatably affixing plastic material to sheets, comprising a rotatable pad cylinder having a resilient covering of substantial depth, sheet supply means, means to positively rotate said pad cylinder to draw a sheet to be covered thereover, means to brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, and on its lower surface a centrally inset feed portion and a pressure plate beyond said feed portion providing a sheet discharge slot discharging in the direction of movement of said sheet to provide a sheet of plastic material on the surface thereof, means to supply supplemental weight to the fountain to urge said fountain in damming relationship against the resilient surface of said pad cylinder and to provide a positive drive nip, a source of liquid plastic material supply connected to said fountain reservoir, and a source of gaseous fluid under compression connected to the source of liquid plastic material supply.

13. A combination fountain and ironing member for compressing a continuously running sheet against a pad cylinder of a machine for continuously permeatably affixing plastic material to sheets, comprising an oblong member having a central liquid plastic material reservoir having a plurality of aligned feed orifices projecting downwardly therefrom, a valve shaft extending transversely of said fountain member to intersect said orifices having a plurality of diametric holes therein movable into and out of alignment with said orifices, a feed shoe detachable securable to the lower end of said fountain having a plurality of aligned liquid plastic material feeding and compacting grooves therein overlying said sheet commencing substantially adjacent the center thereof and discharging in the direction of movement of said sheet of lesser cross-sectional area than said orifices discharging therein adjacent the inlet ends thereof and of progressively decreasing height to force said liquid plastic material in stripes within said moving sheet and to provide aligned stripes of plastic material on the surface thereof integral with said permeated stripes.

14. A combination fountain and ironing member for compressing a continuously running sheet against a pad cylinder of a machine for continuously permeatably affixing plastic material to sheets, comprising an oblong member having a central liquid plastic material reservoir having a plurality of aligned feed orifices projecting downwardly therefrom, a valve shaft extending transversely of said fountain member to intersect said orifices having a plurality of diametric holes therein movable into and out of alignment with said orifices, a feed shoe detachable securable to the lower end of said fountain having a plurality of aligned liquid plastic material feeding and compacting grooves therein overlying said sheet commencing substantially adjacent the center thereof and discharging in the direction of movement of said sheet of lesser cross-sectional area than said orifices discharging therein adjacent the inlet ends thereof to provide aligned stripes of plastic material on the surface of said sheet.

15. A machine for continuously permeatably affixing plastic material to sheets comprising a rotatable pad cylinder having a soft rubber covering of substantial depth, sheet supply means, means to positively rotate said pad cylinder to draw a sheet to be covered thereover, means to positively brake said sheet supply means, sheet take-up means, a combination fountain and ironer of greater width than said sheet having a front portion resting on said pad cylinder to overlyingly abut and compress said sheet against said pad cylinder to provide a drive and sheet feed nip, having a liquid plastic material reservoir having a plurality of aligned feed orifice means projecting downwardly therefrom in rear of said front sheet compressing and hence sheet feeding portion, said fountain having feeding means connected to said feed orifice means on the lower surface thereof providing passageway means extending a distance longitudinally of said sheet to feed plastic material on said sheet passing thereunder, means to supply supplemental weight to the fountain to urge said feeding means in damming relationship against the resilient surface of said pad cylinder and to provide a positive drive nip, a pressure cylinder having a removable cover, an open container having a removed shipping cover and containing liquid plastic material, contained within said pressure cylinder, said cylinder cover having a supply pipe projecting therethrough extending to the bottom of said container and having a valve therein, a flexible hose connecting said pipe to said fountain reservoir, means capable of standing a high compressing to detachably secure said pressure cylinder cover to said pressure cylinder, and a source of gaseous fluid under compression connected to said pressure cylinder exterior of said container to feed said liquid plastic material to said feeding means under substantial gaseous fluid pressure.

16. A machine for continuously permeatably affixing plastic material to sheets, comprising a rotatable pad cylinder having a resilient covering of substantial depth, sheet supply means, means to positively rotate said pad cylinder to draw a sheet to be covered thereover, sheet take-up means, a combination fountain and ironer of greater width than said sheet having a front portion resting on said pad cylinder to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, a valve shaft extending transversely of said fountain to intersect said orifice means having diametric hole means therein movable into and out of alignment with said orifice means and having feeding means on the lower surface providing passageway means extending a distance longitudinally of said sheet to feed plastic material on said sheet passing thereunder, means to supply supplemental weight to the fountain to urge said feeding means in damming relationship against the resilient surface of said pad cylinder and to provide a positive drive nip, a source of liquid plastic material supply connected to said fountain reservoir, a source of gaseous fluid under compression connected to the source of liquid plastic material supply, and a handle for said valve shaft.

17. A machine for continuously permeatably affixing plastic material to sheets, comprising a frame, a rotatable pad cylinder having a resilient covering of substantial depth, sheet supply means, means to positively rotate said pad cylinder to draw a sheet to be covered thereover, sheet take-up means, a combination fountain and ironer pivotally mounted on said frame having a front portion to overlyingly abut and compress said sheet against said pad cylinder to provide a drive and sheet feed nip, a central liquid plastic material reservoir having coating plastic material feeding means on the lower surface thereof in rear of said front sheet compressing and hence sheet feeding portion providing passageway means extending a distance longitudinally of said sheet to feed plastic material on said sheet passing thereunder, means to supply supplemental weight to the pivotally mounted fountain to urge said feeding means in damming relationship against the resilient surface of said pad cylinder and to provide a positive drive nip, means to supply liquid plastic material to said feeding means under gaseous fluid pressure, sheet supply means in front of said nip, means to brake said sheet supply means and sheet take-up means beyond said nip.

18. A machine for continuously permeably affixing plastic material to sheets, comprising a frame, a rotatable pad cylinder having a resilient covering of substantial depth, sheet supply means, means to positively rotate said pad cylinder to draw a sheet to be covered thereover, sheet take-up means, a combination fountain and ironer pivotally mounted on said frame having a front portion to overlyingly abut and compress said sheet against said pad cylinder to provide a drive and sheet feed nip, a central liquid plastic material reservoir having a plurality of aligned feed orifices projecting downwardly therefrom in front of said front sheet compressing and hence sheet feeding portion, a plurality of aligned liquid plastic material feeding and compacting grooves therein overlying said sheet commencing substantially adjacent the center thereof and discharging in the direction of movement of said sheet of lesser cross-sectional area than said orifices discharging therein at the inlet ends thereof to provide aligned spaced stripes of plastic material on the surface of said sheet, means to supply supplemental weight to the pivotally mounted fountain to urge said feeding means in damming relationship against the resilient surface on said pad cylinder and to provide a positive drive nip, means to supply liquid plastic material to said feeding means under gaseous fluid pressure, sheet supply means in front of said nip, means to brake said sheet supply means and sheet take-up means beyond said nip.

19. A machine for continuously permeably affixing plastic material to sheets, comprising a frame, a rotatable pad cylinder having a resilient covering of substantial depth, sheet supply means, means to positively rotate said pad cylinder to draw a sheet to be covered thereover, sheet take-up means, a combination fountain and ironer pivotally mounted on said frame having a front portion to overlyingly abut and compress said sheet against said pad cylinder to provide a drive and sheet feed nip, a central liquid plastic material reservoir having feed orifice means projecting downwardly therefrom in rear of said front sheet compressing and hence sheet feeding portion, and on its lower surface a centrally inset feed portion and a pressure plate beyond said feed portion providing a sheet discharge slot discharging in the direction of movement of said sheet to provide a sheet of plastic material on the surface thereof, means to supply supplemental weight to the pivotally mounted fountain to urge said feeding means in damming relationship against the resilient surface of said pad cylinder and to provide a positive drive nip, means to supply liquid plastic material to said feeding means under gaseous fluid pressure, sheet supply means in front of said nip, means to brake said sheet supply means and sheet take-up means beyond said nip.

20. A machine for affixing plastic material to sheets comprising backing means having a resilient covering of substantial depth, means to continuously move said backing means, fountain and ironer means of greater width than a sheet having a front portion resting on said backing means and having coating plastic material feeding means in rear of said front portion, to feed plastic material on said sheet passing thereunder, means to supply pressure to the fountain and ironer means to urge said front portion in damming relationship against said resilient backing means to compress the sheet to be covered passing thereover to provide a positive drive and sheet feed nip, means to supply liquid plastic material to said feeding means under pressure, sheet supply means in front of said nip, means to control the tension of said sheet to said nip, and sheet take-up means beyond said nip.

21. A machine for affixing plastic material to sheets comprising backing means, having a resilient covering of substantial depth, means to continuously move said backing means, fountain and ironer means of greater width than a sheet having a front portion resting on said backing means and having coating plastic material feeding means in rear of said front portion, providing passageway means extending a distance longitudinally of said sheet of progressively decreasing height in the direction of sheet travel to feed and compress plastic material on said sheet passing thereunder, means to supply pressure to the fountain means to urge said front portion in damming relationship against said resilient backing means to compress the sheet to be covered passing thereover to provide a positive drive and sheet feed nip, means to supply liquid plastic material to said feeding means under pressure, sheet supply means in front of said nip, means to control the tension of said sheet to said nip, and sheet take-up means beyond said nip.

HAROLD A. EVANS.